United States Patent
Packard et al.

(10) Patent No.: US 6,421,214 B1
(45) Date of Patent: Jul. 16, 2002

(54) ARC FAULT OR GROUND FAULT DETECTOR WITH SELF-TEST FEATURE

(75) Inventors: Thomas N. Packard; James P. Romano, both of Syracuse, NY (US)

(73) Assignee: Pass & Seymour, Inc., Syracuse, NY (US)

(*) Notice: Subject to any disclaimer, the term of this patent is extended or adjusted under 35 U.S.C. 154(b) by 0 days.

(21) Appl. No.: 09/518,603

(22) Filed: Mar. 3, 2000

(51) Int. Cl.[7] .............................. H02H 3/00; H02H 7/00
(52) U.S. Cl. ................................................ 361/7
(58) Field of Search ............................. 361/2, 3, 4, 5, 361/6, 7, 42, 45, 49, 115, 93

(56) References Cited

U.S. PATENT DOCUMENTS

| | | |
|---|---|---|
| 4,872,081 A | 10/1989 | Murphy et al. |
| 5,202,662 A | 4/1993 | Bienwald et al. |
| 5,459,630 A | 10/1995 | MacKenzie et al. |
| 5,477,412 A | 12/1995 | Neiger et al. |
| 5,546,266 A | 8/1996 | Mackenzie et al. |
| 5,600,524 A | 2/1997 | Neiger et al. |
| 5,706,155 A | 1/1998 | Neiger et al. |
| 5,715,125 A | 2/1998 | Neiger et al. |
| 5,729,417 A | 3/1998 | Neiger et al. |
| 5,847,913 A | 12/1998 | Turner et al. |
| 5,969,920 A | 10/1999 | Mackenzie |
| 5,982,593 A | 11/1999 | Kimblin et al. |

*Primary Examiner*—Edward H. Tso
(74) *Attorney, Agent, or Firm*—Wall Marjama & Bilinski LLP (57) ABSTRACT

A self-testing arc fault or ground fault detector includes arc fault detecting circuitry and components. The detector includes a testing circuit which tests at least part of the circuitry and components and generates a recurring signal when the test completes successfully. If the test does not complete successfully, the signal is lost. This loss of signal is signaled by an indicator connected to the testing circuit. In one version, the loss of signal activates a circuit interrupter which disconnects the load side of the detector from the line side.

85 Claims, 3 Drawing Sheets

ARC FAULT OR GROUND FAULT DETECTOR WITH SELF-TEST FEATURE

BACKGROUND OF THE INVENTION

1. Field of the Invention

This invention relates generally to protective devices that may include Arc Fault Protection or Ground Fault Protection or both, and more particularly to a protective device comprising fail safe features.

2. Description of the Prior Art

A percentage of fires each year is caused by electrical branch circuit line arcing which is of a duration, and at a level, that does not activate the thermal or magnetic trip elements in conventional circuit breakers in time to prevent a fire. A high percentage of electrocutions each year is caused by a current flow through the body to ground, the level of which is too low, to activate the thermal or magnetic trip elements in conventional circuit breakers in time to prevent electrocution.

Arc detection is an enhancement to thermal magnetic overload detection typically used in circuit breakers, which otherwise may not detect and respond to arc faults. A number of devices for detecting arc faults and methods of detection have been used in the past. These include the use of E and B field arc sensors, detecting the amplitude of the rate of change of current signals when an arc fault occurs, the use of non-overlapping band pass filters to detect white noise that is characteristic of arcs, and detecting the disappearance of signals indicating the presence of arcs near zero current crossings. While some of these techniques are more or less effective, they require relatively sophisticated arc sensors and circuits and heretofore, most of these arc detection circuits have been incorporated in circuit breakers.

A number of devices and methods for detecting ground faults have been used in the past. Typically ground faults are detected using B field sensors for sensing a difference between line neutral current together with integrators or low pass filters and are more or less effective. Heretofore, ground fault detection circuits have been incorporated in circuit breakers or receptacles.

There is a need for simple economical arc fault detectors that can be included in wiring devices such as receptacles, plugs, or in-line devices, and that offer the same protection as an arc fault detector incorporated in a circuit breaker, but at lower cost. There is a need for an arc fault circuit interrupter (AFCI) in wiring devices that can be provided at a reduced cost compared with arc fault circuit detecting circuit breakers that is comparable to the difference in cost between ground fault interrupting receptacles and ground fault interrupting circuit breakers. There is the need for a sensor and associated circuitry that are miniaturized.

There is need for simple economical ground fault detectors that are either independent or a part of an arc fault device and that can be included in wiring devices, but also at lower cost.

There is a need for improved device reliability and for reporting to the user of the protective device if there is a device malfunction, and for reporting within a short time interval after the occurrence of the malfunction.

SUMMARY OF THE INVENTION

It is an object of this invention to provide an arc fault circuit interrupter, also known as AFCI, that employs an electrical circuit that is simple enough, inexpensive enough and small enough to be included in wiring devices.

It is another object of this invention to provide an arc fault circuit interrupter that is sensitive to relatively low amplitude series arc faults of at least 5 amps of arc current, typically in series with the load and commonly referred to as Type A faults.

It is another object of this invention to provide an arc fault circuit interrupter that detects parallel or line to line arcs, producing currents of 75 amps or more, commonly referred to as Type B arc faults.

It is another object of this invention to provide a ground fault circuit interrupter that detects power line leakages to ground, typically at 60 Hertz, whose current is 5 milliamps or more.

It is a principal object of this invention to provide all of the above identified features in an arc fault detector that monitors its own operation, and deactivates itself in the event of a malfunction.

This invention discloses a Protective Device having an automatic, self-test feature that determines if the device is operational. The self-test feature is accomplished with miniature, low cost electronic components. This allows for the protective device with the additional self-test feature to be constructed to fit into a wiring device sized package and which may also permit a dual-purpose arc and ground fault detection circuit in the same package.

Briefly stated, and in accordance with a presently preferred embodiment of the invention, an arc fault or ground fault detector for detecting disturbance on the electric power lines includes at least one sense transformer, at least one detector for determining whether the sensed signal exceeds a threshold, a processor for analyzing the timing characteristics of the detected signal, a trip mechanism that is enabled by the processor if pre-established timing characteristics are discerned from the sensed and detected signal, and interrupting contacts in at least one of the electric power lines for interrupting power to the protected terminals of the device in response to the enabled trip mechanism. The processor also receives signal from a clock, and the clock also generates a recurring signal to test one or more components of the device. If one or more components is malfunctioning, the processor determines that the test failed and the processor delivers a signal to an indicator to report the malfunction to the user. In another embodiment, a computer operating properly (COP) timer is interposed between the processor and the trip mechanism. If all components including the processor are operational, the processor outputs a recurring signal to the COP, timer, then the COP timer does not activate the trip mechanism, and the interrupting contact remain closed. If there is an interruption of the recurring signal from the processor, then the COP timer enables the trip mechanism, and the interrupting contacts are opened. In this way, the device components are self-tested. Alternatively, the processor can produce a second recurring signal derived from the clock, the second recurring signal not influenced by the test result previously described. The second recurring signal occurs at a higher rate than the first recurring signal in order to reduce time constants within the COP timer, in order to facilitate construction of the COP timer. The first recurring signal is operated at a comparatively lower rate so that the time required to self test the device does not interfere with the ability of the device to detect an occurrence of a true fault condition. Taken together, the second recurring signal connected to the COP timer checks the operation of the processor, and the first recurring signal tests the components of the device as previously described.

The protective device contains a clock, which generates a recurring clock signal. The clock signal initiates a plurality of test signals upon each occurrence. The test signals serve to evaluate the various electrical and mechanical elements of the protective device, the operational status of the protective device being displayed using at least one indicator. In another embodiment of the invention, the protective device receives the recurring clock signal from a remote master controller and may report the operational status of the protective device back to the master controller. In yet another embodiment, if the plurality of test signals each yield an acceptable test result, an enabling signal is generated. The enabling signal recurs with each acceptable test result to maintain closure of the interrupting contacts, consequently the protective device delivering power to the protected terminals of the device. If there is a lapse of recurring enabling pules for a pre-established period, the interrupting contacts open, and the protective device is disconnected from the source of power. Alternatively, the enabling signals can recur at a second recurring rate or the enabling signals can continue regardless of the test result, the disappearance of enabling signals representing different modes of device failure.

BRIEF DESCRIPTION OF THE DRAWINGS

The novel aspects of the invention are set forth with particularity in the appended claims. The invention itself, together with further objects and advantages thereof may be more readily comprehended by reference to the following detailed description of a presently preferred embodiment of the invention taken in conjunction with the accompanying drawings, in which:

DESCRIPTION OF THE PREFERRED EMBODIMENT

Figure 1:
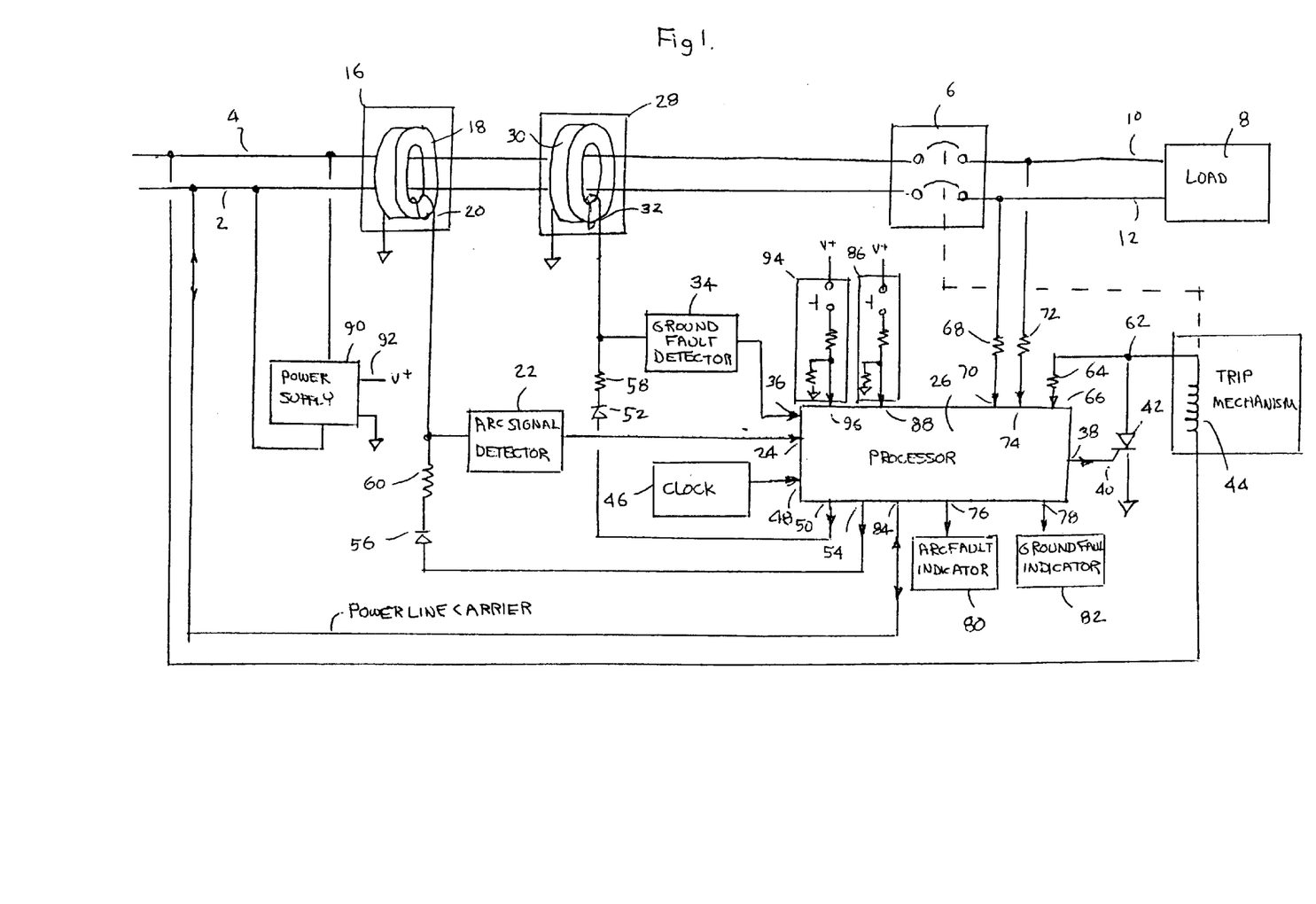
FIG. 1 is a schematic diagram of a protective device affording arc fault and ground fault protection, where components of the device are tested on a recurring, pre-established timing interval.

Referring now to FIG. 1, a combination arc fault circuit detector and ground fault circuit interrupter of the present invention is illustrated in schematic form. The device shown in FIG. 1, as well as the devices shown in the remaining figures are formed from small inexpensive components that can be easily integrated into an electrical receptacle, plug or in-line device. The circuit is designed so that it can be manufactured in the same form as the ground fault circuit interrupter devices shown in U.S. Pat. Nos. 5,594,358 and 5,510,760 for example. The circuit can also be integrated into circuit breakers.

The combination arc fault circuit detector and ground fault circuit interrupter of FIG. 1 protects an electrical circuit including at least a neutral conductor 2 and a line conductor 4. A ground may also be present and the protective device of FIG. 1 will detect arcs occurring between the line conductor and ground, the neutral conductor and ground, or the line and neutral conductors and arcs occurring in series with the line or neutral conductor. The arc fault circuit interrupter may also detect power faults occurring between the line conductor and ground. A circuit interrupter 6 is connected in series with the electrical circuit, between the power source and the load 8. A contractor or similar device may be employed, which includes a first set of contacts connected to the neutral conductor 2 and to the load by way of conductor 12, and a second set of contacts connected to the line conductor 4, and to the load by conductor 10. Preferably, the first and second contacts are spring loaded by a mouse trap type arrangement, and controlled by trip mechanism 14. When the trip mechanism 14 is activated, the spring-loaded contacts are opened and latch in an open condition until they are manually reset. Contractors of this type are per se well known, and are shown, for example, in U.S. Pat. No. 5,510,760. Alternatively, the trip mechanism 14 and circuit interrupter 6 can be a relay in which the contacts are normally open. For this alternative construction, when the trip mechanism 14 is de-activated, the contacts are biased open until such time as trip mechanism 14 is reactivated.

The embodiment of FIG. 1 incorporates a self-test feature. Sensor 16 is a current transformer for sensing arc fault currents that includes a physically small, toroid shaped core 18 having an aperture through which line conductor 4 and neutral conductor 2 pass, the two conductors comprising primary windings of the current transformer, and a multi-turn secondary winding 20 wound on core 18. The terminals of multi-turn winding 20 constitute the output of current transformer 16 and are connected to an input 21 of an arc signal detector 22. An output of arc signal detector 22 is connected to an input 24 of a processor 26. A ground fault sensor 28, core 30, through which the line conductor 4 and neutral conductor 2 pass to form dual primary windings, and a multi-turn secondary winding 32, is connected to an input 33 of a ground fault detector 34, these elements are similar in nature to the arc fault stages previously described, but are configured for the detection of ground fault currents. An output 35 of ground fault detector 34 is connected to an input 36 of processor 26. Detectors 22 and 34 produce a signal if the respective arc fault or ground fault signals from sensors 16 and 28 have a magnitude that exceeds pre-established thresholds or that otherwise indicate the occurrence of an arc fault or a ground fault, respectively. As previously described, the arc fault and ground fault detectors are independent of each other and either may be omitted without effect on the other. Alternatively, sensor 16 may be configured with a multi-turn winding (not shown) to detect both arc faults and ground faults, in which case sensor 28 is omitted and the input of ground fault detector 34 is connected to the multi-turn winding.

Processor 26 analyzes the time distribution of arc fault or ground fault detected signal, and if the time distribution is in accordance with a pre-established characteristic, a positive signal is produced at an output 38 of processor 26 which is connected to gate 40 of SCR 42 to turn on SCR 42 whose conduction enables current to flow through a solenoid 44 of trip mechanism 14. Trip mechanism 14 thereby activates, and the contacts of circuit interrupter 6 open. Arc faults or ground faults from conductor 10 to ground are interrupted thereby. Arc faults due to damaged insulation between conductors 10 and 12 or due to a discontinuity in line conductor 4 or neutral conductor 2 are also interrupted.

Components in the schematic of FIG. 1 as described are subject to damage induced by power line transients from the power source, aging, corrosion, mechanical stress and the like. The present invention includes a self-test feature for ascertaining if a component malfunction has occurred.

A clock 46 produces recurring pulses derived from a quartz crystal oscillator, zero-cross detection of the power line frequency, or the like, which are sent to input 48 of processor 26. Processor 26 may be a microprocessor having an internal clock controlled by a software loop with periodic interrupt. Processor 26 has an output 50 that produces an output signal in response to a predetermined number of pulses received at processor input 48. Output 50 is connected to diode 52 in series with a resistor 58 to a multi-turn winding 32. Output 50 provides a recurring positive voltage test signal to normally non-conductive diode 52, to test multi-turn winding 32. If multi-turn winding 32 is continuous there is no appreciable voltage across the winding or consequently at the input of ground fault detector 34, and no signal is produced at output 35, or received at processor input 36. Processor 26 interprets this absence of signal as an acceptable test result. Likewise, there is a processor output 54 and diode 56 connected in series with resistor 60 and multi-turn winding 20 that checks the continuity of multi-turn winding 20. In an alternative method, multi-turn windings are typically wound of fine gauge wire having a significant DC resistance. Resistor 58 disposed between diode 52 and the resistance of multi-turn winding 32 divides the test voltage from processor output 50 and the resulting voltage at the input of ground fault detector 34 appearing at processor input 36 is indicative of the resistance and turns count accuracy of multi-turn winding 32. Likewise, resistor 60 disposed between diode 56 and multi-turn winding 20 serves to determine the turns count accuracy of multi-turn winding 20. Furthermore, the functionality of detectors 22 and 34 are demonstrated by the proper transmission of expected signal amplitudes therethrough.

Clock 46 also initiates other tests. Resistor 64 connects a signal from anode 62 of SCR 42 to processor input 64. If solenoid 44 connected to line conductor 4 is continuous, a voltage is produced at anode 62 of normally open SCR 42. The voltage communicated to processor input 64 is strobed in relationship to pulses from clock 46, and the existence of voltage at input 66 is interpreted by processor 26 as indicating a functional solenoid 44.

Impedances 68 and 70, which are preferably resistors but may be complex impedances, connect conductors 10 and 12 to processor inputs 70 and 74 respectively. Processor 26 contains a memory for storing data indicating whether a signal has been transmitted to processor output 38 to open circuit interrupter contacts 6 as previously described. A current flows through impedance 68 if conductor 4 is attached to the neutral side of the power source, and conductor 2 is connected to the line side of the power source, so that self-testing continues to be provided under this miswired condition. The voltages at processor inputs 70 and 74 are strobed in relationship to pulses from clock 46. The absence of voltage on both inputs 70 and 74, for a predetermined interval, is interpreted by processor 26 as functionally open, non-welded contacts. Impedances 68 and 72 may be resistors as shown in FIG. 1, or capacitors, or resistors and capacitors in series.

Processor 26 is provided with one or more outputs for fault indication. Processor 26 has a first fault indicator output 76 for indication of a failure of one or more component associated with arc fault detection and a second fault indicator output 78 for indication of a failure of one or more component associated with ground fault circuit interruption. Alternatively, ground fault and arc fault failure indication can be achieved with a single indicator. Fault indicators 80 and 82 are connected to outputs 76 and 78 and may be any permutation of lights that illuminate to indicate malfunction, that extinguish to indicate malfunction and/or are of different colors. The indicators may be either steadily lit or flashing, or may be audible or mechanical indicators, arranged in a configuration intended to be conveniently observable to the user. As a further alternative, a flashing indicator can also flash in various patterns to reveal the type of fault.

Processor 26 also has an input/output 84 that provides one or two way power line communication. Processor input/output 84 may receive signal from an external clock in substitution for clock 46, or may transmit test result information to an external indicator. Processor output 84 sends or receives signal on conductor 2 or 4 or the two conductors in combination. Alternatively, output 84 can send or receive signal on a wire that is independent of the power conductors. Processor output 84 may receive signal from an external clock from a remote controller or monitor thereby, in substitution to clock 46, or may transmit test result information to an external indicator located at the remote controller or monitor. The remote controller or monitor may have provision for resetting or manually testing the protective device.

The embodiment of FIG. 1 also includes a manually operable test button 86 connected to a processor input 88. When test button 86 is depressed a voltage appears on processor input 88, initiating the test algorithm. Indicator 80 or 82 displays a failing result to the user. Processor 26 senses the voltage at input 88 and sends a signal to processor output 38 to open interrupter contacts 6 as previously described.

The circuit of FIG. 1 also includes a power supply 90 that receives AC power from conductors 2 and 4, or alternately from conductors 10 and 12, converting the power to a DC voltage at output 92 for powering the circuitry in FIG. 1 as previously described, including processor 26. In an alternate method, trip mechanism 14 is a relay and interruption contacts 6 are normally open. As previously described, trip mechanism 14 may be of a mousetrap construction and interruption contacts are normally closed. In the alternate method, interruption contacts 6 are closed in response to a current through solenoid winding 44 in response to enablement of SCR 42 as a result of signal at SCR gate 40 produced by output 38 of processor 26. Processor 26 fails to produce signal at processor output 38 if there is a previous fault condition even if physically removed, or if there is a previous simulated fault condition produced by manual test button 86 or by self test, as previously described. As a result of a fault or simulated fault conditions, interruption contacts 6 remain open until such time as there is reclosure effected by a manual intervention. In the alternate method, manual intervention can be accomplished by a manually operable reset button 94 connected to processor input 96, or may be accomplished additionally by removal and restoration of AC voltage, likewise causing removal and restoration of voltage at output 92 of power supply 90. Processor 26 provides a signal at processor output 38 in response to the removal and restoration of supply voltage, or to a signal appearing at processor input 96. Output 38 is connected to SCR gate terminal 40. When an output signal is produced, SCR 42 conducts, trip mechanism 44 is enabled, and interrupter contacts 6 reclose, constituting a reset condition of the device. In this manner, removal and restoration of line voltage, manual closure of a reset button, or both may reset the device.

Figure 2:
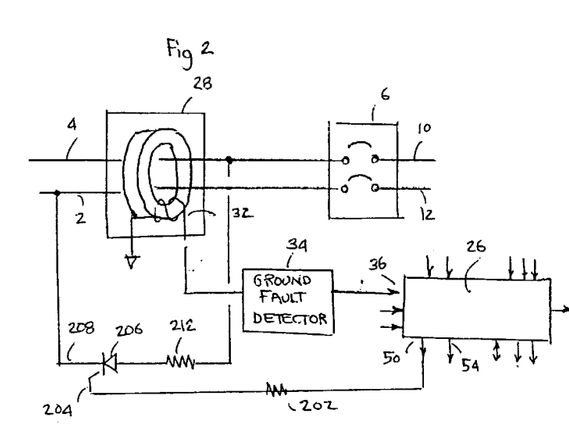
FIGS. 2 and 2A–2C show the ground fault sensor stage of schematic diagram 1 in which the sensor stage is tested using an alternate method.
Figure 2A:
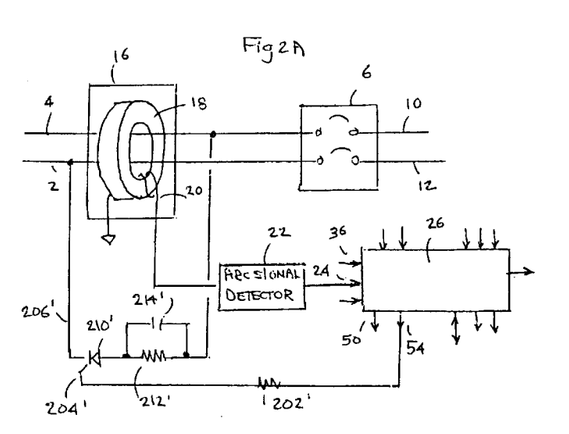
Figure 2B:
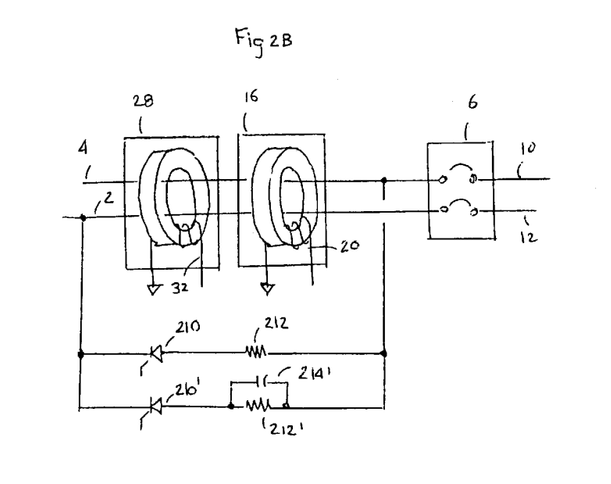
Figure 2C:
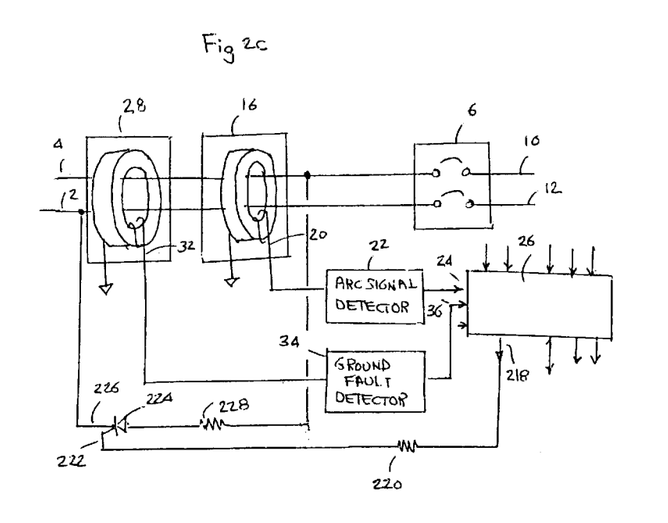

The remaining figures show alternate embodiments of the arc fault and ground fault device as shown in FIG. 1. For purposes of illustration, like components are designated by like reference numbers. In FIG. 2 an alternate method of testing ground fault sensor 28 is demonstrated. Processor output 50 in FIG. 1 is connected to resistor 202 in series with gate 204 of SCR 210. The cathode 206 of SCR 210 is connected to the neutral conductor 2 or alternatively to conductor 12, and the anode 208 of SCR 210 is connected in series with resistor 212 to the line conductor 4 or alternately to conductor 10. The two power connections are on either side of ground fault sensor 28. A test signal at processor output 50 causes SCR 210 to conduct, imposing a differential current on sensor 28, the differential current equaling the dissimilarity in currents between conductors 2 and 4, the differential current determined by the impedance of resistor 212 and the line voltage. The differential current is the primary or sensed current on sensor 28. Impedance 212 may be a 15 kilo-ohm resistor and processor 50 signal maintained, so that current through impedance 212 is essentially proportional to the power line frequency. A signal having an expected amplitude based on the construction of sensor 28 is received at the input of ground fault detector 34, providing for a test on the ground fault sensor 28 and the ground fault detector 34 as previously described. An optocoupler device or other known solid state devices may replace SCR 210. Alternate embodiments are in FIGS. 2A–C. In FIG. 2A, arc fault sensor 16 can be likewise tested, in which processor output 54 in FIG. 1 is re-connected to like components in FIG. 2, the components bearing primed designations. The signal at output 54 can be a train of pulses designed to simulate an arc fault condition. Impedance 212 may be a resistor in parallel with a capacitor 214', for achieving a sufficient test current to test the arc fault device. FIG. 2B is an arc fault device with additional ground fault protection, in which the circuits in FIG. 2 and FIG. 2A are combined to share the two power connections, the power connections made to conductor 2 or 12 and conductor 4 or 10 as described in FIG. 2, also the power connections made on either, non-adjacent sides of sensors 28 and 16. In this manner, the test signals imparted by closure of SCRs 210 or 210' impose the same signal on sensors 16 and 28, where sensor 28 and ground fault detector 34 are solely responsive to the signal imparted by SCR 210, and sensor 16 and arc signal detector 22 are solely responsive to the signal imparted by SCR 210'. Considering an arc fault and ground fault device constructed in the manner of FIGS. 2 and 2A, four power connections are required to test the operation of the arc fault and ground fault sensors. An arc fault and ground fault device constructed in the manner of FIG. 2B requires only two power connections, serving to simplify production assembly. FIG. 2C is an alternate AFCI having additional GFCI protection, for demonstrating additional production assembly simplification. A single processor output 218 take the place of processor outputs 50 and 54, from which a resistor 220 is connected to gate 222 of SCR 224. Cathode 226 of SCR 224 is connected to neutral conductor 2 or alternatively to conductor 12, and anode 230 of SCR 222 is connected in series with an impedance 228 chosen for arc fault and ground fault testing. The other end of impedance 228 is connected to line conductor 4 or alternately to line conductor 10. Processor output 218 may produce two types of test signals for testing arc fault and ground fault calibration. In this manner, the calibration of the arc fault and ground fault sensors may be tested either separately or in combination.

Figure 3:
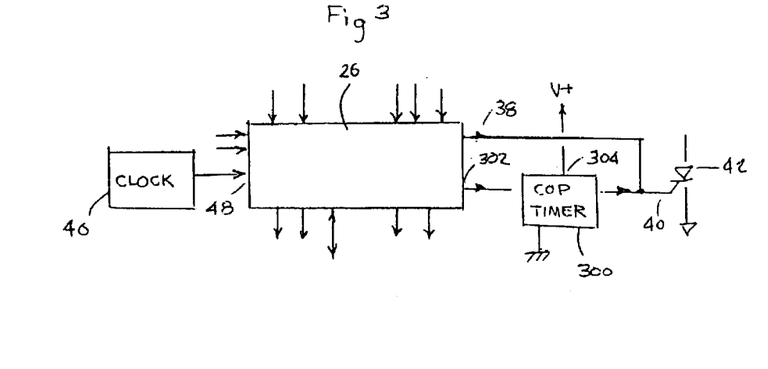
FIG. 3 is an additional component added to schematic diagram 1 for providing an alternate recurring test method.

In FIG. 3 a computer operating properly (hereinafter referred to as a "COP") timer 300 is connected between an additional processor output 302 and SCR gate 40. SCR gate 40 also receives signal from processor output 38 as previously described. Processor 26 delivers test pulses to output 302 each time the regularly spaced, recurring test signal initiated from a pre-determined multiple of pulses from clock 46 is acceptable. Pulses from output 302 reset COP timer 300, and COP timer 300 never times out. If recurring test results are unacceptable, the absence of reset signal at the input of COP timer 300 for a pre-established interval allows a time out, and COP timer 300 directs SCR 42, to open interruption contacts 6. In this manner, the operation of processor 26 is self-tested in addition to the other stages as previously described. Furthermore, the interruption contacts 6 assume a fail-safe, open, position if self-test failure is encountered.

In FIG. 3, terminal 304 of COP timer 300 receives voltage from output 92 of power supply 90. Alternatively terminal 304 can be connected to a second source of power (not shown), or COP timer 300 can be constructed to perform the previously described function without the need for a source of power. Given the alternate constructions, if the source of power 90 fails thus eliminating the reset signal at the input of COP timer 300, COP timer 300 is still operative, whereby interruption contacts 6 open as previously described. If the source of power 90 is operative but the second source of power fails, COP timer 300 is disabled thereby, but output terminal 38 is still able to deliver signal to gate terminal 40 of SCR 42, permitting interruption contacts 6 to open as previously described. In this manner, the performance of the power supply is self tested in addition to the stages previously described, and a supply failure does not impair operation of the device.

Alternatively, the signal at processor output 302 recurs on the basis of a pre-determined multiple of pulse from clock 46, but the signal at processor output 302 continues to recur irrespective of the test result previously described. Therefore, the absence of pulses at processor output 302 tends to be limited to a malfunction of power supply 90 or processor 26. As in the previously described manner, absence of pulses at output 302 for a predetermined time causes COP timer 300 to time out and interrupting contacts 6 to open. COP timer 300 typically establishes the pre-determined time interval using an R-C time constant. In order to maintain practical component values in the time constant, the recurring rate of pulses from processor output 302 can be based on a second pre-determined number of pulses from clock 46. In the preferred embodiment, the recurring pulses at processor output 302 recur every 32 milliseconds or less and the recurring pulses that establish the test of device as previously described, recur every 5 seconds or more. The recurring test repetition rate is determined so as not interfere with the ability of the device to detect a true fault condition.

As previously described, processor 26 delivers a test pulses to output 302 each time the regularly spaced, recurring test signal is generated by a pre-determined number of pulses from clock 46, or if the test algorithm initiated by depressing manually operable test button 86, is acceptable. Processor output 302 sends a signal to COP timer 300. SCR gate 40 receives signal from either processor output 38 or from COP timer 300. In the alternative embodiment, processor output 38 is omitted and SCR gate 40 receives a signal only from COP timer 300. As before, processor 26 produces pulses at output 302 if the recurring self-test is acceptable. However, in the alternative embodiment when the manually operable test button 86 is depressed, and the test algorithm initiated by the test button is acceptable, there is a cessation of recurring signal at output 302. COP timer 300 times out, signal is received at gate 40 of SCR 42, SCR 42 conducts, trip mechanism 14 is activated, and interrupting contacts 6 open. Opening of the interrupting contacts 6 is made evident to the user, by illuminating or extinguishing a lamp, sounding an audible alarm, flashing a lamp, changing the color of a lamp or moving a flag or a button. The advantage of the alternative embodiment is that the proper operation of the COP timer 300 is a requisite for the opening of contacts 6, and the performance of COP timer 300 is proven thereby.

Figure 4:
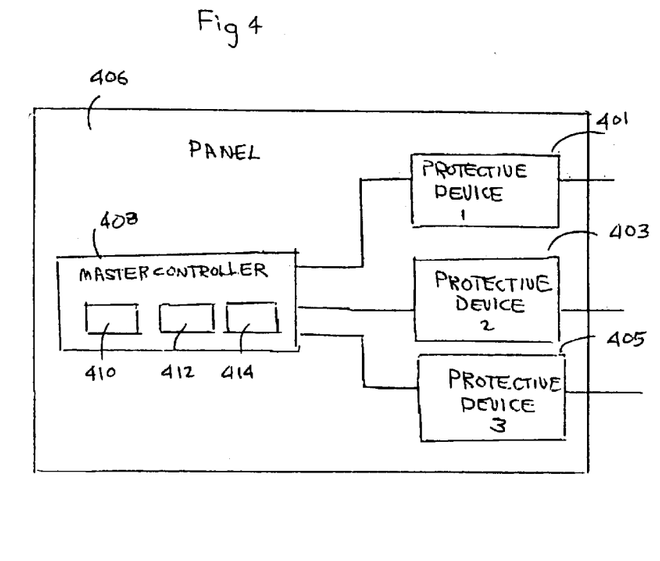
FIG. 4 is a block diagram of an array of protective devices as in schematic diagram 1 mounted in a power distribution panel whose recurring testing is directed or monitored by a single controller.

In FIG. 4 an array of protective devices 401, 401 and 403 each including the test circuit of FIG. 1 are located in a panel 406 of the type commonly used in residences for distribution of electrical power. Processor output 84 (as shown in FIG. 1) communicates with a master controller 408. Master controller 408 may have a clock 410 that is a substitution for and serves the same function as clock 46 in FIG. 1, whereby clock 410 initiates a self test of the array of protective devices 401, 402, and 403. Likewise master controller 408 may have at least one indicator 412 and 414 serving the same function as indictors 80 and 82 in FIG. 1. Master controller 410 may have a manually operable switch that is a substitution for and serves the same function as manually operable switch 86 of FIG. 1. Or, absent a fault condition identified by processor 26, Master controller 410 may direct processor 26 to reset the device through reclosure of interruption contacts 6 as previously described.

Figure 5:
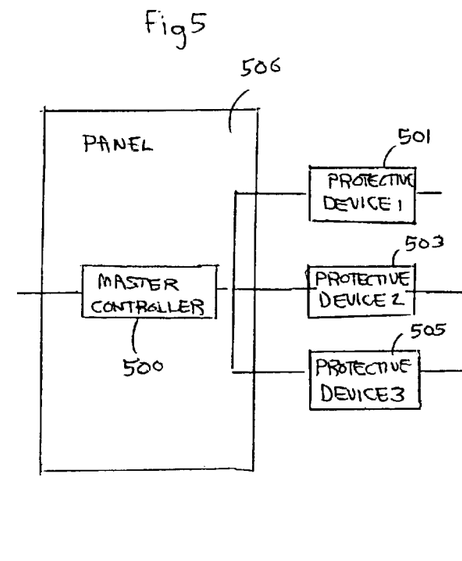
FIG. 5 is a block diagram of an array of protective devices as in schematic diagram 1 mounted in separate boxes as wiring devices, whose recurring testing is directed or monitored by a single controller.

In FIG. 5 the master controller 500 is the same as controller 408 in FIG. 4. Unlike FIG. 4, the array of protective devices 501, 502 and 503 are external to panel 506, and may be located in wall boxes suitable for wiring devices such as receptacles.

While the invention has been described in connection with a number of presently preferred embodiments thereof, those skilled in the art will recognize that many modifications, permutations, and changes may be made therein without departing from the true spirit and scope of the invention, which accordingly is intended to be defined solely by the appended claims.

What is claimed is:

1. A self testing arc fault detector comprising:
   a transformer coupled to an electrical circuit and responsive to an arcing condition in the circuit for generating a signal;
   a detector responsive to the signal for indicating the presence of an arcing condition;
   a clock generating periodic timing signals, and
   a test generator connected to the transformer and the clock for periodically applying a test signal to the transformer for producing a first signal if the transformer is not operational,
   a fault detector connected to the transformer and the clock for generating a fault signal unless a first signal is received within a predetermined time after receipt of a timing signal.

2. The self-testing arc fault detector of claim 1 in which the test signal comprises a current signal, and the first signal comprises a low voltage appearing across the winding if the winding is continuous, and a higher voltage appearing across the winding if the winding is discontinuous.

3. A self testing arc fault detector comprising:
   a plurality of arc fault detecting components
   a disconnect device;
   a testing circuit for testing at least one component and generating a recurring signal when the at least one component is operating normally; and
   an indicator connected to the testing circuit for providing an indication if the recurring signal is lost.

4. The self-testing arc fault detector of claim 3 in which the at least one component comprises a solenoid of the disconnect device, and the test comprises measuring the voltage on a winding of the solenoid.

5. The self-testing arc fault detector of claim 3 in which the at least one component comprises a pair of contacts of the disconnect device, and the test comprises measuring the voltage at the pair of contacts.

6. The self-testing arc fault detector of claim 3 in which the at least one component comprises an SCR, and the test comprises applying a voltage to a gate of the SCR.

7. The arc fault detector of claim 3 wherein said indicator is a lamp that extinguishes if the recurring signal is lost.

8. The self-testing arc fault detector of claim 3 wherein said indicator comprises a lamp that is illuminated if the recurring signal is lost.

9. The self-testing arc fault detector of claim 3 wherein said indicator comprises an audible alarm.

10. The self-testing arc fault detector of claim 3 in which the at least one component comprises a transformer, and the test comprises passing a current through a secondary winding of the transformer.

11. The self-testing arc fault detector of claim 3 in which the at least one component comprises a transformer, and the test comprises passing a current through a primary winding of the transformer.

12. A self testing arc fault detector comprising:
    a plurality of arc fault detecting components
    a disconnect device;
    a testing circuit for testing at least one component and generating a recurring signal when the at least one component is operating normally; and
    a detector connected to the disconnect device and to the testing circuit for activating the disconnect device if the recurring signal is lost.

13. The self-testing arc fault detector of claim 12 comprising a processor connected between the testing circuit and the detector, the processor generating a second recurring signal having a higher rate than the first recurring signal, the detector responsive to loss of the second recurring signal to activate the disconnect device.

14. The self-testing arc fault detector of claim 12 comprising a clock generating a clock signal, and in which the testing circuit performs a test upon each occurrence of the clock signal, and generates the recurring signal when the test is successful.

15. The self-testing arc fault detector of claim 12 comprising a clock input for connection to a remote source of clock signals, the clock input connected to the testing circuit so that the testing circuit performs a test upon each occurrence of a clock signal, and generates the recurring signal when the test is successful.

16. The self-testing arc fault detector of claim 13 in which the testing circuit performs a plurality of tests on a plurality of components, and generates a signal upon the successful completion of each test, the detector responsive to the loss of the signal indicating failure of any one test, to activate the disconnect device.

17. The self-testing arc fault detector of claim 12 in which the at least one component comprises a transformer, and the test comprises passing a current through a secondary winding of the transformer.

18. The self-testing arc fault detector of claim 12 in which the at least one component comprises a transformer, and the test comprises passing a current through a primary winding of the transformer.

19. The self-testing arc fault detector of claim 12 in which the at least one component comprises an arc detector, and the test comprises applying a train of pulses to an input of the arc detector.

20. The self-testing arc fault detector of claim 12 in which the at least one component comprises a ground fault transformer, and the test comprises applying a signal to an input of the ground fault transformer that simulates a ground fault.

21. The self-testing arc fault detector of claim 12 in which the at least one component comprises a power supply, and the test comprises determining the output voltage of the power supply.

22. The self-testing arc fault detector of claim 21 comprising a second power supply, the first power supply connected to the testing circuit, and the second power supply connected to the detector.

23. The self-testing arc fault detector of claim 12 comprising an indicator connected to the fault detector.

24. The self-testing arc fault detector of claim 23 comprising an indicator that exhibits a pattern that corresponds to the nature of the fault detected.

25. The self-testing arc fault detector of claim 23 wherein said indicator comprises a lamp that is illuminated as a result of a test failure.

26. The self-testing arc fault detector of claim 23 wherein said indicator comprises an audible alarm.

27. The self-testing arc fault detector of claim 12 in which the at least one component comprises a trip mechanism, the operation of which is determined upon each recurring clock signal.

28. The self-testing arc fault detector of claim 27 comprising an indicator connected to the fault detector.

29. The self-testing arc fault detector of claim 27 in which the trip mechanism comprises a solenoid winding, and the testing circuit is connected to the solenoid winding, and failure of the trip mechanism is determined by passing a second test signal through said solenoid winding for determining the operating condition of said trip mechanism thereby.

30. The self-testing arc fault detector of claim 29 in which the trip mechanism comprises:
   interrupting contacts connected to the trip mechanism; and
   wherein the magnitude of the second test signal is insufficient to cause motion of said interrupting contacts.

31. The self testing arc fault detector of claim 30 comprising an impedance connected between at least one of said contacts and the testing circuit, to communicate open or closure status of said contacts to said testing circuit.

32. The self-testing arc fault detector of claim 31 wherein said impedance is a resistor.

33. The self-testing arc fault detector of claim 32 comprising a capacitor in series with the resistor.

34. A self-testing ground fault detector comprising:
   a transformer coupled to an electrical circuit and responsive to a ground fault condition in the circuit for generating a signal;
   a detector responsive to the signal for indicating the presence of a ground fault condition;
   a clock generating periodic tinting signals, and
   a test generator connected to the transformer and the clock for periodically applying a test signal to the transformer for producing a first signal if the transformer is not operational,
   a fault detector connected to the test generator and the clock for generating a fault signal unless the first signal is received within a predetermined time after receiving a timing signal.

35. The self-testing ground fault detector of claim 34 in which the test signal comprises a current signal, and the first signal comprises a low voltage appearing across the winding if the winding is continuous, and a higher voltage appearing across the winding if the winding is discontinuous.

36. A self-testing ground fault detector comprising:
   a plurality of ground fault detecting components
   a disconnect device;
   a testing circuit for testing at least one component and generating a recurring signal when the at least one component is operating normally; and
   a detector connected to the disconnect device and to the testing circuit for activating the disconnect device if the recurring signal is lost.

37. The self-testing ground fault detector of claim 36 comprising a processor connected between the testing circuit and the detector, the processor generating an independent second recurring signal having a higher rate than the first recurring signal, the detector responsive to loss of the second recurring signal to activate the disconnect device.

38. The self-testing ground fault detector of claim 36 comprising a clock generating a clock signal, and in which the testing circuit performs a test upon each occurrence of the clock signal, and generates the recurring signal when the test is successful.

39. The self-testing ground fault detector of claim 36 comprising a clock input for connection to a remote source of clock signals, the clock input connected to the testing circuit so that the testing circuit performs a test upon each occurrence of a clock signal, and generates the recurring signal when the test is successful.

40. The self-testing ground fault detector of claim 37 in which the testing circuit performs a plurality of tests on a plurality of components, and generates a signal upon the successful completion of each test, the detector responsive to the loss of the signal indicating failure of any one test, to activate the disconnect device.

41. The self-testing ground fault detector of claim 36 in which the at least one component comprises a transformer, and the test comprises passing a current through a secondary winding of the transformer.

42. The self-testing ground fault detector of claim 36 in which the at least one component comprises a transformer, and the test comprises passing a current through a primary winding of the transformer.

43. The self-testing ground fault detector of claim 36 in which the at least one component comprises a ground fault detector, and the test comprises applying a train of pulses to an input of the ground fault detector.

44. The self-testing ground fault detector of claim 36 in which the at least one component comprises an arc fault transformer, and the test comprises applying a signal to an input of the ground fault detector that simulates a ground fault.

45. The self-testing ground fault detector of claim 36 in which the at least one component comprises a power supply, and the test comprises determining the output voltage of the power supply.

46. The self-testing arc fault detector of claim 45 comprising a second power supply, the first power supply connected to the testing circuit, and the second power supply connected to the detector.

47. A self testing ground fault detector comprising:
   a plurality of ground fault detecting components a disconnect device;

a testing circuit for testing at least one component and generating a recurring signal when the at least one component is operating normally; and an indicator connected to the testing circuit for providing an indication if the recurring signal is lost.

48. The self-testing ground fault detector of claim 47 in which the at least one component comprises a solenoid of the disconnect device, and the test comprises measuring the voltage on a winding of the solenoid.

49. The self-testing ground fault detector of claim 47 in which the at least one component comprises a pair of contacts of the disconnect device, and the test comprises measuring the voltage at the pair of contacts.

50. The self-testing ground fault detector of claim 47 in which the at least one component comprises an SCR, and the test comprises applying a voltage to a gate of the SCR.

51. The ground fault detector of claim 42 wherein said indicator is a lamp that extinguishes if the recurring signal is lost.

52. The self-testing ground fault detector of claim 47 wherein said indicator comprises a lamp that is illuminated if the recurring signal is lost.

53. The self-testing ground fault detector of claim 47 wherein said indicator comprises an audible alarm.

54. The self-testing arc fault detector of claim 47 comprising an indicator that exhibits a pattern that corresponds to the nature of the fault detected.

55. An arc fault detector comprising:

a power supply;

an arc fault sensor;

an arc signal detector, connected to the arc fault sensor and to the power supply;

a processor, connected to the arc signal detector and to the power supply;

a clock generating a recurring signal, connected to the processor;

the processor arranged to respond to the operation of the arc signal detector upon each recurring clock signal, and an indicator connected to the processor for displaying the condition of the arc fault detector.

56. A self-testing, combination arc fault and ground fault detector comprising:

a plurality of arc fault detecting components;

a plurality of ground fault detecting components;

a disconnect device responsive to the arc fault detecting components and the ground fault detecting components for disconnecting an electrical circuit in the event of a fault;

a testing circuit connected to at least one of the ground fault detecting components, and at least one of the arc fault detecting components for generating a recurring signal when the at least one ground fault detecting component and the at least one arc fault detecting component is operating normally; and a detector connected to the disconnect device and to the testing circuit for activating the disconnect device if the recurring signal is lost.

57. The self-testing, combination arc fault and ground fault detector of claim 56 in which the testing circuit comprises a clock for generating the recurring signal.

58. The self-testing, combination arc fault and ground fault detector of claim 56 comprising an indicator connected to the testing circuit for indicating the status of the plurality of arc fault detecting components.

59. The self-testing, combination arc fault and ground fault detector of claim 56 comprising an indicator connected to the testing circuit for indicating the status of the plurality of ground fault detecting components.

60. The self-testing, combination arc fault and ground fault detector of claim 56 comprising an indicator connected to the testing circuit for indicating the status of the plurality of ground fault detecting components and the plurality of arc fault detecting components.

61. The self-testing, combination arc fault and ground fault detector of claim 60 comprising a pair of indicators for indicating the status of the plurality of ground fault detecting components and the plurality of arc fault detecting components respectively.

62. The self-testing, combination arc fault and ground fault detector of claim 61 comprising a pair of indicators of different colors.

63. A ground fault circuit interrupter comprising:

a power supply, a ground fault sensor generating a signal in response to a ground fault, a ground fault detector connected to the ground fault sensor generating an output signal in response to a ground fault, a processor connected to the ground fault detector, and responsive to the output signal for generating a disconnect signal, a trip mechanism connected to the processor and having interrupting contacts, and responsive to the disconnect signal for disconnecting an electrical signal, a clock connected to the processor for generating a recurring signal, a test circuit connected to the clock for determining the operation of the ground fault circuit interrupter upon each clock signal, and an indicator connected to the test circuit for displaying the results of the test.

64. The ground fault circuit interrupter of claim 63 wherein said indicator is a lamp that is normally illuminated and extinguishes as a result of test failure.

65. The ground fault circuit interrupter of claim 63 wherein said indicator is a lamp that is normally extinguished and illuminates as a result of test failure.

66. The ground fault circuit interrupter of claim 63 wherein said indicator is an audible alarm.

67. The self-testing ground fault detector of claim 63 in which the trip mechanism comprises a solenoid, and the test circuit is connected to the solenoid and passes a current through a winding of the solenoid.

68. The self-testing ground fault detector of claim 67 in which the trip mechanism comprises interrupting contacts, wherein the current is insufficient to cause motion of the interrupting contacts.

69. The self-testing ground fault detector of claim 67 comprising an impedance connected between at least one of said contacts and the processor, to communicate open or closure status of said contacts to said processor.

70. The self-testing ground fault detector of claim 67 wherein said impedance is a resistor.

71. The self-testing ground fault detector of claim 67 wherein said impedance is a resistor in series with a capacitor.

72. A protective device comprising:

at least one signal detector;

a processor connected to the signal detector;

a clock for generating a recurring signal the processor connected to the clock for initiating a periodic test of the protective device on each clock cycle;

a manually operable test button connected to said processor for manually initiating a test said manually initiated test overriding the test initiated by said recurring signal.

73. The protective device of claim 72 comprising interrupting contacts, wherein manual operation of said test button causes motion in said contacts.

74. The protective device of claim 72 wherein the processor is a microprocessor.

75. The protective device of claim 72 wherein the clock is a portion of the microprocessor.

76. A protective device comprising:

first and second electrical conductors adapted to be connected in series circuit relationship between power line and neutral conductors and an electrical load for delivering voltage to the electrical device;

at least one signal detector coupled to the electrical conductors for detecting a condition;

a processor connected to the signal detector;

a power line carrier interface connected to the processor and the electrical conductors for sending data over power lines to a remote monitoring station;

a clock for generating a recurring signal;

a test circuit responsive to the recurring signal for initiating a periodic test of one or more components of the protective device;

wherein the test outcome of is communicated on at least one of the conductors by the power line; carrier interface to a remote monitoring station.

77. A plurality of protective devices as described in claim 76 and a remote monitoring station responsive to each of the devices.

78. The plurality of protective devices of claim 77 each device comprising memory for storing a unique identifier;

the carrier interface adapted to transmit the unique identifier; and said remote monitoring station able to identify the origin of each test outcome thereby.

79. A protective device comprising:

first and second electrical conductors adapted to be connected in series circuit relationship between power line and neutral conductors and an electrical load for delivering voltage to the electrical device;

at least one signal detector within the device for detecting a condition;

a processor connected to the signal detector;

a power line carrier interface connected between the processor and one of the first and second electrical conductors;

a remote master control unit separate from the protective device, and connected to the protective device solely by an electrical power circuit;

a clock in the remote master control unit for generating a recurring signal for initiating a periodic test of the protective device;

a signal transmitter connected to the clock and to a power line for transmitting the recurring signal to the protective device for initiating a periodic test of the protective device.

80. A protective device as claimed in claim 79 comprising a manually operable test button connected to said processor for manually initiating a test said manually initiated test overriding the test initiated by said recurring signal.

81. A protective device as claimed in claim 79 comprising a manually operable reset button.

82. An array of protective devices as claimed in claim 79, the recurring signal for initiating a periodic test being communicated to each protective device in said array.

83. The array of protective devices of claim 80 in which the power line carrier interface communicates the test outcome from each protective device to said remote monitoring station.

84. The array of protective devices of claim 80 wherein each protective device of the array furthermore comprises a unique electrical identifier, and said remote monitoring station comprises a receiver for identifying the origin of each test outcome from the unique identifier.

85. A protective device comprising:

at least one power conductor;

at least one signal detector coupled to the power conductor for detecting a condition;

a processor connected to the signal detector;

a computer operating properly stage connected to the processor;

a trip mechanism connected to the computer operating properly stage;

interrupting contacts controlled by the trip mechanism connected in series circuit relationship with said at least one-power conductors;

a clock connected to the processor for generating a recurring signal for initiating a processor test of the protective device;

wherein said processor generates a second signal in response to an acceptable test;

wherein, said computer operating properly stage generates a third signal to the trip mechanism for opening the interrupting contacts if the second signal is lost for a predetermined time interval.

\* \* \* \* \*